US009210068B2

(12) United States Patent
Cai et al.

(10) Patent No.: US 9,210,068 B2
(45) Date of Patent: Dec. 8, 2015

(54) MODIFYING SYSTEM ROUTING INFORMATION IN LINK BASED SYSTEMS

(75) Inventors: Xiaohua Cai, Shanghai (CN); Yufu Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 953 days.

(21) Appl. No.: 12/745,254

(22) PCT Filed: Nov. 29, 2007

(86) PCT No.: PCT/CN2007/003367
§ 371 (c)(1),
(2), (4) Date: Jan. 19, 2012

(87) PCT Pub. No.: WO2009/070912
PCT Pub. Date: Jun. 11, 2009

(65) Prior Publication Data
US 2012/0151107 A1      Jun. 14, 2012

(51) Int. Cl.
*G06F 13/00* (2006.01)
*H05K 7/10* (2006.01)
*G06F 15/173* (2006.01)
*H04L 12/751* (2013.01)

(52) U.S. Cl.
CPC ..................... *H04L 45/02* (2013.01)

(58) Field of Classification Search
CPC ............ G06F 17/5077; G06F 13/4081; G06F 9/4413; H04L 45/10; H04L 45/02; H04L 45/00; H04L 45/021
USPC ............................ 710/107, 302; 709/238–244
See application file for complete search history.

(56) References Cited

U.S. PATENT DOCUMENTS

| | | | | |
|---|---|---|---|---|
| 5,649,108 A * | 7/1997 | Spiegel et al. | ................ | 709/241 |
| 5,784,576 A * | 7/1998 | Guthrie et al. | ................ | 710/302 |
| 6,009,488 A | 12/1999 | Kavipurapu | | |
| 6,625,659 B1 * | 9/2003 | Aramizu et al. | .............. | 709/239 |
| 6,647,446 B1 * | 11/2003 | James et al. | .................. | 710/100 |
| 6,665,297 B1 * | 12/2003 | Hariguchi et al. | ............ | 370/392 |

(Continued)

FOREIGN PATENT DOCUMENTS

| | | |
|---|---|---|
| CN | 1564987 A | 1/2005 |
| CN | 1889520 A | 1/2007 |

(Continued)

OTHER PUBLICATIONS

Office Action received for Chinese Patent Application No. 200780101768.6, mailed on May 20, 2013, 8 pages including 5 pages of English Translation.

(Continued)

*Primary Examiner* — Faisal M Zaman
(74) *Attorney, Agent, or Firm* — Alpine Technology Law Group LLC (57) ABSTRACT

Methods and apparatus to improve modification of system routing information in link based systems are described. In one embodiment, entries in a first table (storing data corresponding to routing paths between a plurality of components prior to a hot-plug event) and a second table (storing data corresponding to routing paths between the plurality of components after a hot-plug event) may be compared to determine which corresponding routing registers are to be modified in response to the hot-plug event. Other embodiments are also disclosed.

22 Claims, 6 Drawing Sheets

(56) References Cited

U.S. PATENT DOCUMENTS

| | | | |
|---|---|---|---|
| 6,839,350 B1* | 1/2005 | Inouchi et al. | 370/392 |
| 6,956,858 B2 | 10/2005 | Hariguchi et al. | |
| 7,200,694 B2* | 4/2007 | Yakovlev et al. | 710/48 |
| 7,415,627 B1* | 8/2008 | Radhakrishnan et al. | 714/4.1 |
| 7,493,438 B2* | 2/2009 | Kaushik et al. | 710/302 |
| 7,756,017 B2* | 7/2010 | Goyal et al. | 370/225 |
| 7,836,238 B2* | 11/2010 | Freimuth et al. | 710/302 |
| 2002/0080798 A1* | 6/2002 | Hariguchi et al. | 370/395.31 |
| 2002/0129186 A1* | 9/2002 | Emerson et al. | 710/302 |
| 2003/0065752 A1 | 4/2003 | Kaushik et al. | |
| 2003/0167367 A1* | 9/2003 | Kaushik et al. | 710/302 |
| 2003/0231633 A1 | 12/2003 | Aramizu et al. | |
| 2003/0233474 A1* | 12/2003 | Yamamoto | 709/239 |
| 2005/0058119 A1* | 3/2005 | Inouchi et al. | 370/351 |
| 2005/0083936 A1* | 4/2005 | Ma | 370/392 |
| 2005/0157479 A1* | 7/2005 | Hayden | 361/788 |
| 2005/0289101 A1 | 12/2005 | Jayasimha | |
| 2006/0206648 A1* | 9/2006 | Gupta et al. | 710/302 |
| 2007/0025355 A1* | 2/2007 | Cohen et al. | 370/392 |
| 2007/0118628 A1 | 5/2007 | Kumar et al. | |
| 2007/0136504 A1* | 6/2007 | Wu | 710/302 |
| 2007/0153795 A1 | 7/2007 | Devereux et al. | |
| 2007/0189284 A1* | 8/2007 | Kecskemeti | 370/389 |
| 2008/0005439 A1* | 1/2008 | Matsukuma | 710/302 |
| 2008/0259951 A1* | 10/2008 | Cardona et al. | 370/465 |
| 2009/0144476 A1* | 6/2009 | Cai et al. | 710/302 |
| 2010/0284330 A1 | 11/2010 | Huang | |
| 2010/0287290 A1* | 11/2010 | Bramley et al. | 709/229 |

FOREIGN PATENT DOCUMENTS

| | | | |
|---|---|---|---|
| CN | 1905512 | A | 1/2007 |
| CN | 1989745 | A | 6/2007 |
| JP | 2005-045591 | A | 2/2005 |
| JP | 2006-012112 | A | 1/2006 |
| JP | 2011-501921 | A | 1/2011 |
| KR | 10-0778340 | B1 | 11/2007 |
| WO | 2009/049668 | A1 | 4/2009 |
| WO | 2009/070912 | A1 | 6/2009 |

OTHER PUBLICATIONS

Notice of Allowance received for Japanese Patent Application No. 2010-533409, mailed on May 28, 2013, 4 pages including 1 page of Foreign Associates reporting correspondence.

Office Action received for Japanese Patent Application No. 2010-533409, mailed on Feb. 5, 2013, 2 pages of Office Action and 1 page of English Translation.

Office Action Received for United Kingdom Patent Application No. 1009707.9, mailed on Nov. 7, 2011, 1 page of Office Action.

International Search Report and Written Opinion Received for PCT Application No. PCT/CN2007/003367, mailed on Sep. 11, 2008, 9 pages.

Office Action Received for Chinese Patent Application No. 200780101768.6, mailed on Feb. 3, 2012, 10 pages of Office Action and 16 pages of English Translation.

International Preliminary Report on Patentability Received for the PCT Application No. PCT/CN2007/003367, issued on Jun. 1, 2010, 4 pages.

Office Action Received for Chinese Patent Application No. 200780101768.6, mailed on Nov. 5, 2012, 3 pages of Office Action and 5 pages of English Translation.

Office Action Received for Japanese Patent Application No. 2010-533409, mailed on Sep. 25, 2012, 2 pages of Office Action and 2 pages of English Translation.

Office Action received for Chinese Patent Application No. 200780101768.6, mailed on Dec. 5, 2013, 11 Pages of Office Action and 17 Pages of English Translation.

Office Action received for German Patent Application No. 11 2007 003 722.9, mailed on May 21, 2014, 6 pages of English Translation and 6 pages of Office Action.

Office Action received for Chinese Patent Application No. 200780101768.6, mailed on Jul. 1, 2014, 5 pages of English Translation and 13 pages of CN Office Action.

Office Action received for Chinese Patent Application No. 200780101768.6, mailed on Jan. 21, 2015.

Certificate of Grant received for United Kingdom patent application No. 1009707.9, mailed on Feb. 15, 2012.

* cited by examiner

MODIFYING SYSTEM ROUTING INFORMATION IN LINK BASED SYSTEMS

REFERENCE TO RELATED APPLICATION

This application is related to and claims priority from International Application No. PCT/CN2007/003367 filed on Nov. 29, 2007 and entitled, "MODIFYING SYSTEM ROUTING INFORMATION IN LINK BASED SYSTEMS"; which is entirely incorporated herein by reference for all purposes.

BACKGROUND

The present disclosure generally relates to the field of electronics. More particularly, an embodiment of the invention relates to techniques for modifying system routing information in link based systems.

RAS (Reliability, Availability, and Serviceability) has become a critical feature for modern computer system, especially in the server platforms. In a link based system, such as CSI (Common System Interface), the successful implementation of RAS features such as socket (or link) hot-plug depends on reconfiguration of routing data during runtime. Generally, routing data regarding immediate neighbors of a member of a link based system may be stored in storage devices local to each member of the linked based system. Routing data reconfiguration operations may be handled transparently to the OS (Operation System) by utilizing processing time that would otherwise be used by the OS. Since the OS has its own latency requirement, minimizing the routing table reconfiguration time becomes a key criterion in RAS implementations.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may allow for more efficient and/or faster change of system routing configuration in a link based system (such as a CSI system), e.g., to improve RAS. More particularly, some techniques enable relatively large computing systems (such as blade servers having many routes between various nodes which may also be referred to herein as agents such as discussed with reference to FIG. 1) to more efficiently and/or quickly change system routing configuration, e.g., by reducing the amount of RTA (Routing Table Array) registers that need to be computed and updated, for example, during hot-plug events such as during limited time windows available for SMI (System Management Interrupt), PMI (Platform Management Interrupt) or other interrupt servicing. Also, in an embodiment, system routing configuration may be modified without changing system topology. Additionally, some of the techniques discussed herein may be utilized in various types of computing environments, such as those discussed with reference to FIGS. 1-8.

Figure 1:
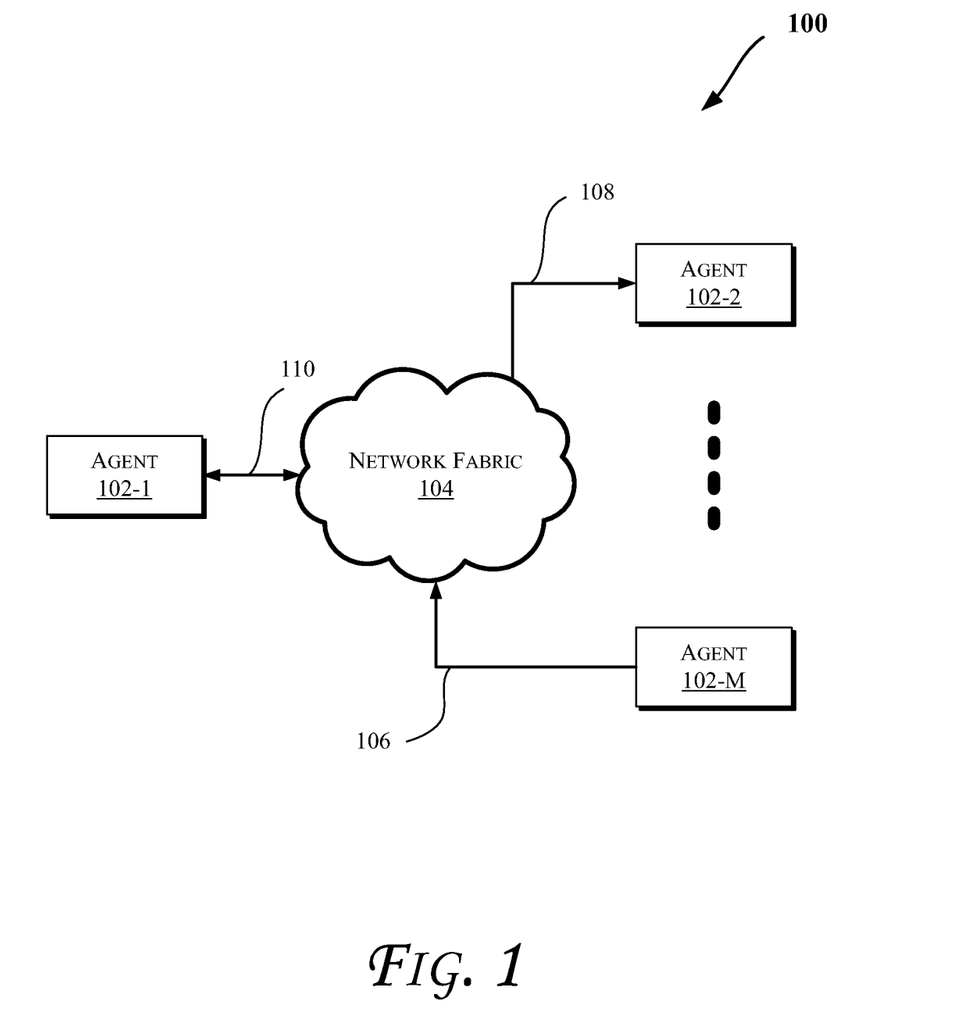
FIGS. 1-2 and 5-8 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2-8.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Figure 2:
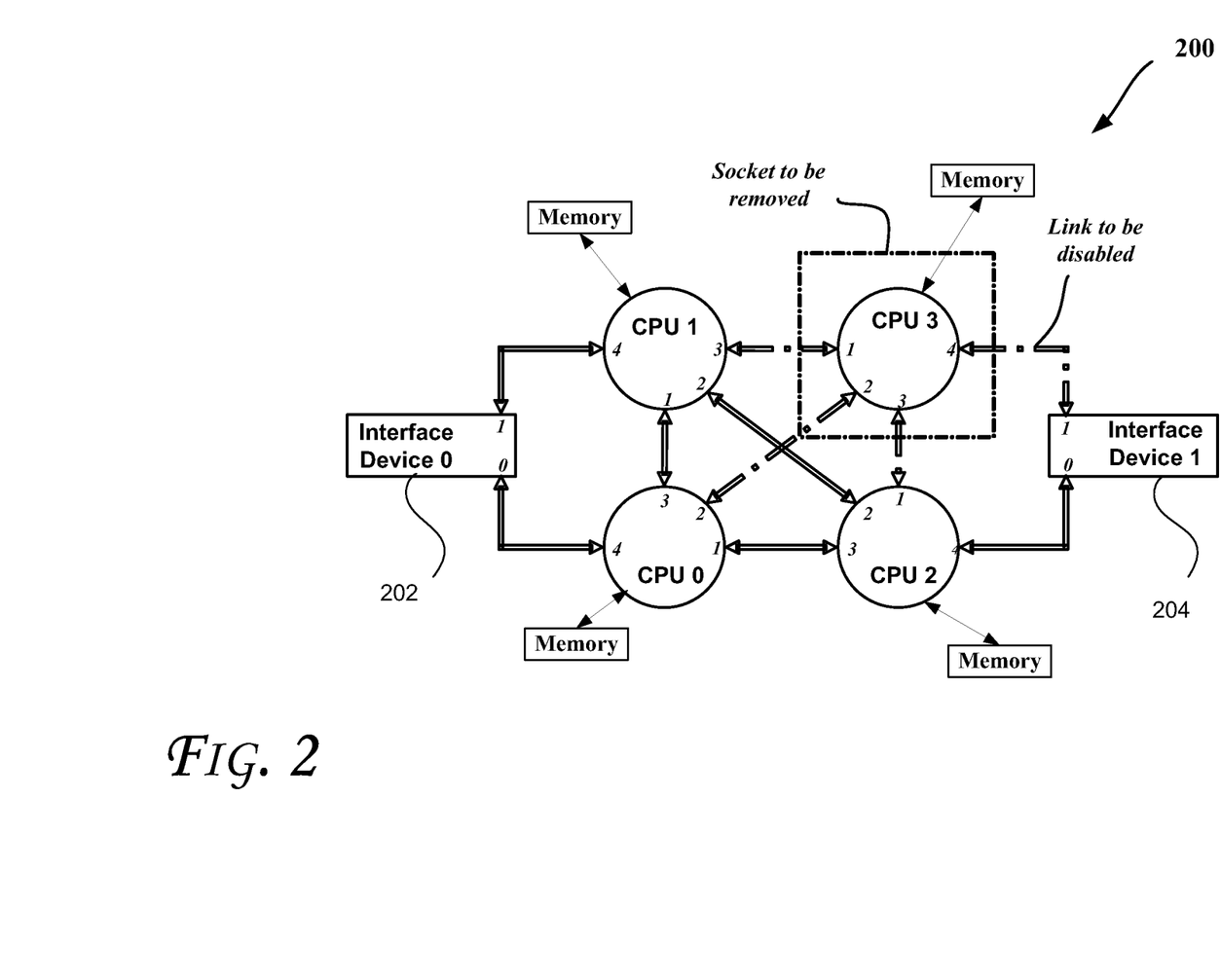

FIG. 2 illustrates a block diagram of a point-to-point (PtP) computing system 200, according to one embodiment of the invention. FIG. 2 shows an example of a CSI link based system with four processors or central processing units (CPUs) (CPU0 through CPU3) and two interface devices 202 and 204, which may be implemented as Input/Output Hubs (IOHs) in some embodiments.

In FIG. 2, the illustrated CPUs and interface devices may be CSI components communicating with each other through CSI links (illustrated as bidirectional arrows). Furthermore, the numbers inside each of the boxes or circles that are coupled to the links illustrate sample port numbers for a given device. As shown in FIG. 2, each of the CPUs may be coupled to a memory subsystem that it is accessible by the respective CPU. Alternatively, one or more of the CPUs may share a memory unit (not shown), in addition to or in place of a dedicated memory subsystem. In some embodiments, the interface devices 202-204 may provide connectivity to I/O devices such as a Peripheral Component Interconnect Express (PCIe) (e.g., complying with PCIe Specification, Revision 2.0, October 2006) and/or an I/O Controller Hub (ICH) such as discussed further with reference to FIG. 7. In one embodiment, the processor-to-processor communication and/or between the processor and the interface device(s) may be performed using CSI packets. Furthermore, each of the CSI components (e.g., including one or more of the CPUs and/or interface devices) may contain a RTA and a Source Address Decoder (SAD). The RTA may provide the CSI packet routing information to other sockets. The SAD may provide a mechanism to represent routing of the resources such as memory, I/O, etc.

For the purpose of explaining one embodiment, assume that CPU3 in FIG. 2 needs to be removed while the OS is running. In some embodiments, the CSI components support a Quiesce mode by which normal traffic could be paused during the RTA/SAD change operations. Generally, such events which involve adding, removing, and/or modifying components of a computing system may be referred to herein as "hot-plug" events. To handle the event associated with removing CPU3, the platform may generate an SMI to inform the Basic Input Output System (BIOS) that a component needs to be removed. In some implementations, the removal operation after the SMI may involve the following:

1. Select one CPU as the Monarch CPU, which is responsible for executing most of SMI events handling code. (Below, CPU0 is taken as Monarch CPU for example);
2. Monarch CPU quiesces the whole system to pause all the traffic going through the CSI links;
3. Monarch CPU computes the new values for the system configuration RTA registers and updates them;
4. Monarch CPU performs other system configuration operations, e.g., computing the new values for SAD registers and updating them, disabling links to the hot-removed socket, etc.; and
5. Monarch CPU de-quiesces the system and releases the non-monarch processors and returns from the SMI. The system continues to run.

In step 3 above, to change system routings, the re-computing routing is performed by first obtaining the new topology of the routing fabric of the socket (or link) being removed. Second, the new values for all RTA registers may be computed. Finally, all RTA registers are updated. This approach is rather inefficient because it will have to go through all the RTA registers, computing their values and updating them, even though they preserve the old value after the hot-plug event, e.g., those RTA registers for routings between CPU0 and CPU1 in the example of FIG. 2. Even worse, for a real system, the RTAs could be a big amount. For example, some CPUs may have 12 ports with 80 RTA entries on each port respectively. So, the process of changing system routings can introduce significant latency, which in turn increases the system pause time during a hot-plug event, even exceeding the OS tolerable deadline in a larger system.

Figure 3:
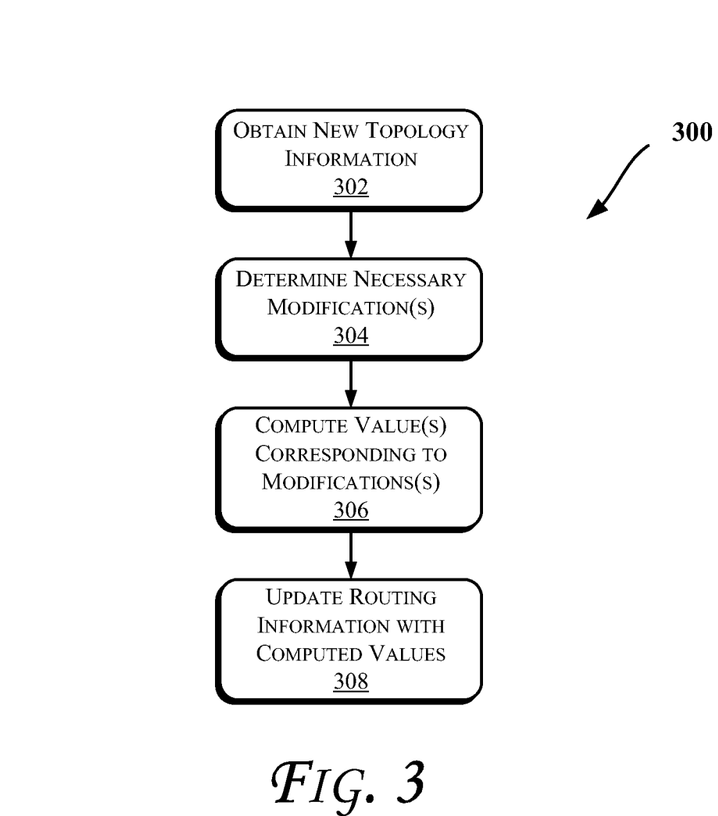
FIGS. 3-4 illustrate flow diagrams of methods according to some embodiments.
Figure 4:
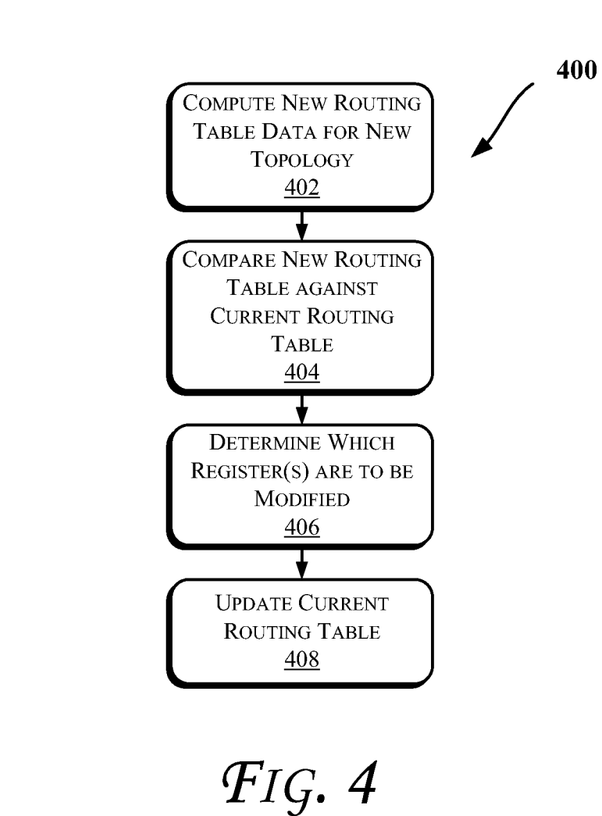

FIGS. 3-4 illustrate flow diagrams of methods 300 and 400, respectively, that may be utilized to more efficiently and/or quickly update routing information in a computing system, according to an embodiment. In one embodiment, various components discussed herein, e.g., with reference to FIGS. 1-2 and 5-8 may be utilized to perform one or more of the operations discussed with reference to FIG. 3 or 4.

Referring to FIGS. 1-3, at an operation 302, after initiation of a hot-plug event (e.g., as indicated by an interrupt such as an SMI or PMI), new topology of the routing fabric of the socket (or link) being removed, added, and/or modified may be obtained, e.g., by reference to a system level routing table. In one embodiment, an intermediate data table (which may be referred to herein as a "Routing-Data-Table") may be used to compute register values for the new routing fabric as well as filter the changed RTA registers. The cells of the Routing-Data-Table may contain the information to route the transactions from a source to a destination.

For example, Table 1 below illustrates an example table corresponding to FIG. 2 before CPU3 is removed. The routing information is computed through the routing algorithm, which could be specific or based on the system requirement. The example of the Table 1 is computed by the minimal distance algorithm; namely, each cell in the table indicates the minimal routing path from a given source (row) to a give destination (column). However, embodiments of the invention are not limited to the minimal distance algorithm and any routing algorithm may be used with its output adapted to be compliant with the format of the Routing-Data-Table.

TABLE 1

Example of (Current) Routing-Data-Table for Full Connection

| From | To | | | | | |
|------|------|------|------|------|------|------|
|      | CPU0 | CPU1 | CPU2 | CPU3 | IOH0 | IOH1 |
| CPU0 | n/a  | 3    | 1    | 2    | 4    | 1.2  |
| CPU1 | 1    | n/a  | 2    | 3    | 4    | 2.3  |
| CPU2 | 3    | 2    | n/a  | 1    | 2.3  | 4    |
| CPU3 | 2    | 1    | 3    | n/a  | 1.2  | 4    |
| IOH0 | 0    | 1    | 0.1  | 0.1  | n/a  | 0.1  |
| IOH1 | 0.1  | 0.1  | 0    | 1    | 0.1  | n/a  |

Moreover, such routing information may be the intermediate result to compute the final RTA register value. For a link based system, the routing fabric on each component may be implemented with ports, entries, and virtual channels, etc. So, a number of successive computations may be performed. Also, depending on the implementation, some or all of the routing table information may be computed at system startup or otherwise before you before-hand. Other implementations may compute at least some of the routing table information during a hot-plug event. Furthermore, in some embodiments, the new topology may be obtained by various means at operation 302, such as based on information provided by a third-part system management/assistant agent, being discovered dynamically, etc.

At an operation 304, any necessary modifications may be determined. For example, since each cell in the Routing-Data-Table contains the routing information from the source to the destination, if a cell value does not change before and after the hot-plug event, the corresponding RTA register values will not need to change either; otherwise, RTA register values are changed to route the transitions to new ports or paths.

For example, Table 2 below illustrates an example of (New) Routing-Data-Table for CPU3 to be removed from FIG. 2. In an embodiment, at operation 304, by comparing the cell values in the Routing-Data-Tables of the topology before (Table 1) and after the hot-plug event (Table 2), the RTA registers, which need to be computed further and updated finally, could be filtered out to increase speed and/or reduce latency associated with a hot-plug event.

TABLE 2

Example of (New) Routing-Data-Table for CPU3 to be Removed

| From | To | | | | | |
|------|------|------|------|------|------|------|
|      | CPU0 | CPU1 | CPU2 | CPU3 | IOH0 | IOH1 |
| CPU0 | n/a  | 3    | 1    | n/a  | 4    | 1    |
| CPU1 | 1    | n/a  | 2    | n/a  | 4    | 2    |
| CPU2 | 3    | 2    | n/a  | n/a  | 2.3  | 4    |
| CPU3 | n/a  | n/a  | n/a  | n/a  | n/a  | n/a  |
| IOH0 | 0    | 1    | 0.1  | n/a  | n/a  | 0.1  |
| IOH1 | 0    | 0    | 0    | n/a  | 0    | n/a  |

For example, by comparing Table 2 with Table 1, it becomes apparent that removal of CPU3 results in changes to 6 cells, while 15 cells preserve their previous values. In some embodiments, the current table may be stored in a different memory device than the new table (e.g., the tables may be stored in different memory subsystems or caches discussed with reference to FIG. 2). Alternatively, the tables may be stored in the same memory device (such a shared memory device or a private memory device).

For example, assuming that for each cell time T is needed for the successive computation and hardware updating, then the time spent is reduced from (15+6)T=21T to 6T and it is 3.5 times faster. If one considers the hot-add case (e.g., adding CPU3), then the Table 1 corresponds to the Routing-Data-Table after the topology changes, while the Table 2 is the original configurations. This is because the cells from and to CPU3 should be counted, so the time spent is reduced from (21+10)T=31T to (6+10)T=16T, which is about 2 times faster. Accordingly, based on the determination made at operation 304, an operation 306 computes the new values for the filtered RTA registers. At an operation 308, the routing information may be updated based on the computed values of operation 306 (e.g., only filtered RTA registers of operation 304 are updated).

FIG. 4 illustrates a flow diagram of a method 400 that may be used to perform operation 304 of FIG. 3, according to an embodiment. At an operation 402, new Routing-Data-Table for the new topology may be computed. In one embodiment, operation 402 may be performed for neighboring components of the component being removed, added, and/or modified. At an operation 404, the new table may be compared against the current table as discussed with reference to FIG. 3. Based on the comparison of operation 404, the registers (e.g., RTA registers) that are to be modified (or filtered) can be determined at operation 406. At an operation 408, the current routing table may be updated with data from the new routing table computed at operation 402.

Because some embodiments may filter only changed RTA registers, as systems increase the number of their components, it becomes apparent that such embodiments will also result in better returns. For example, in FIG. 5, a relatively large system 500 with 12 processors is shown, where CPU7 (which is in the center of the system) is to be added. Table 3 below corresponds to system 500. As can be seen, the number of cells changed and unchanged are 62 and 70 respectively, so it improves the performance for (62+70)T to 62T, which is more than 2 times faster.

TABLE 3

Example of CPU7 to be Added

Figure 5:
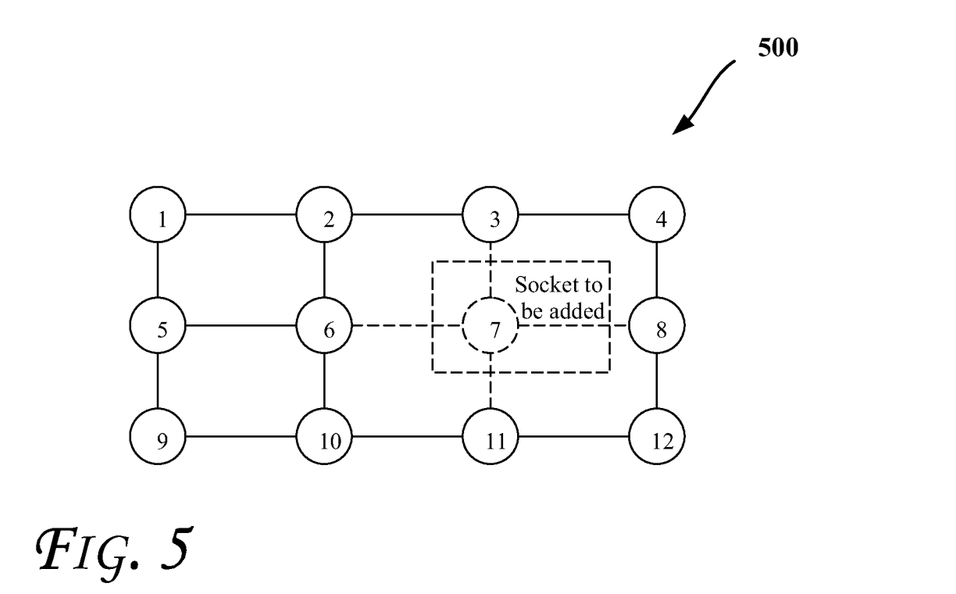

| Routing From | Routing To (Changed) | Count | Routing To (Unchanged) | Count |
|---|---|---|---|---|
| 1 | {7, 8} | 2 | {2, 3, 4, 5, 6, 9, 10, 11, 12} | 9 |
| 2 | {7, 8, 11} | 3 | {1, 3, 4, 5, 6, 9, 10, 12} | 8 |
| 3 | {5, 6, 7, 8, 9, 10, 11, 12} | 8 | {1, 2, 4} | 3 |
| 4 | {5, 6, 7, 11} | 4 | {1, 2, 3, 8, 9, 10, 12} | 7 |
| 5 | {7, 8} | 2 | {1, 2, 3, 4, 6, 9, 10, 11, 12} | 9 |
| 6 | {3, 4, 7, 8, 11, 12} | 6 | {1, 2, 5, 9, 10} | 5 |
| 7 | {1, 2, 3, 4, 5, 6, 8, 9, 10, 11, 12} | 11 | { } | 0 |
| 8 | {1, 2, 3, 5, 6, 7, 9, 10, 11} | 9 | {4, 12} | 2 |
| 9 | {7, 8} | 2 | {1, 2, 3, 4, 5, 6, 10, 11, 12} | 9 |
| 10 | {3, 7, 8} | 3 | {1, 2, 4, 5, 6, 9, 11, 12} | 8 |
| 11 | {1, 2, 3, 4, 5, 6, 7, 8} | 8 | {9, 10, 12} | 3 |
| 12 | {3, 5, 6, 7} | 4 | {1, 2, 4, 8, 9, 10, 11} | 7 |
| Sum | — | 62 | — | 70 |

Figure 6:
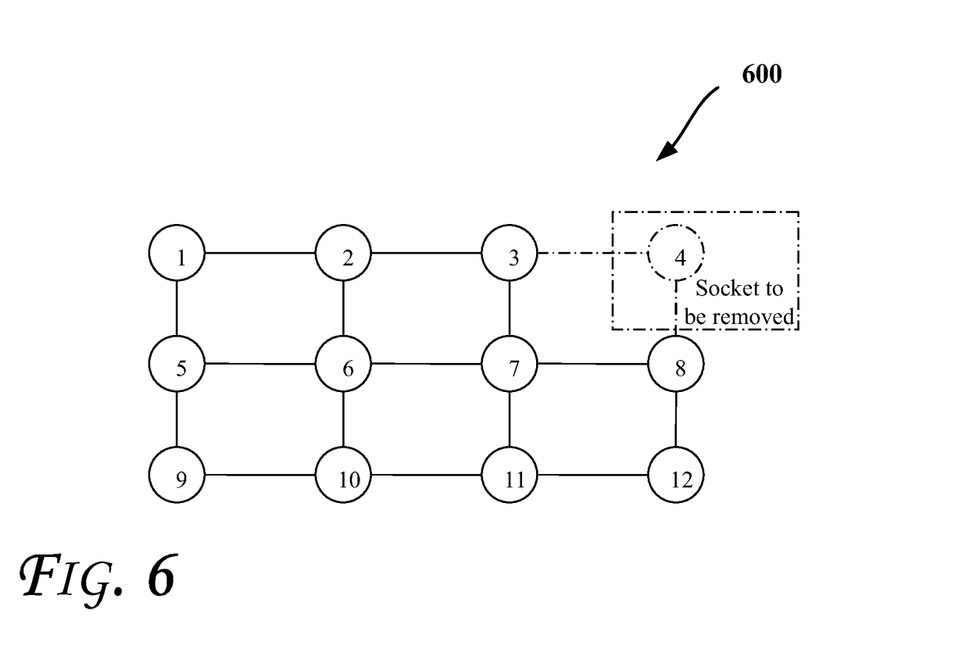

Further, in system 600 of FIG. 6, a corner CPU (CPU4) is to be removed. Table 4 below corresponds to system 600. For this example, only 3 cells are change, so the time spent on routing reconfiguration is reduced from (3+107)T to 3T, which is more than 35 times faster.

TABLE 4

Example of CPU4 to be Removed

| Routing from | Routing To (Changed) | Count | Routing To (Unchanged) | Count |
|---|---|---|---|---|
| 1 | { } | 0 | {2, 3, 5, 6, 7, 8, 9, 10, 11, 12} | 10 |
| 2 | { } | 0 | {1, 3, 5, 6, 7, 8, 9, 10, 11, 12} | 10 |
| 3 | {8, 12} | 2 | {1, 2, 5, 6, 7, 9, 10, 11} | 8 |
| 4 | Needn't care | — | Needn't care | — |
| 5 | { } | 0 | {1, 2, 3, 6, 7, 8, 9, 10, 11, 12} | 10 |
| 6 | { } | 0 | {1, 2, 3, 5, 7, 8, 9, 10, 11, 12} | 10 |
| 7 | { } | 0 | {1, 2, 3, 5, 6, 8, 9, 10, 11, 12} | 10 |
| 8 | {3} | 1 | {1, 2, 5, 6, 7, 9, 10, 11, 12} | 9 |
| 9 | { } | 0 | {1, 2, 3, 5, 6, 7, 8, 10, 11, 12} | 10 |
| 10 | { } | 0 | {1, 2, 3, 5, 6, 7, 8, 9, 11, 12} | 10 |
| 11 | { } | 0 | {1, 2, 3, 5, 6, 7, 8, 9, 10, 12} | 10 |
| 12 | { } | 0 | {1, 2, 3, 5, 6, 7, 8, 9, 10, 11} | 10 |
| Sum | — | 3 | — | 107 |

Accordingly, in some embodiments, an intermediate routing data table which contains routing information from a source to a destination may be used. By comparing data tables of before and after a hot-plug event, a minimal set of RTA registers need be computed and update to increase performance. Furthermore, even though socket hot-plug events are discussed herein as examples, embodiments discussed herein also work well with link hot-plug. The above example uses the SMI to describe the invention; similar techniques may be used in systems with the PMI.

Figure 7:
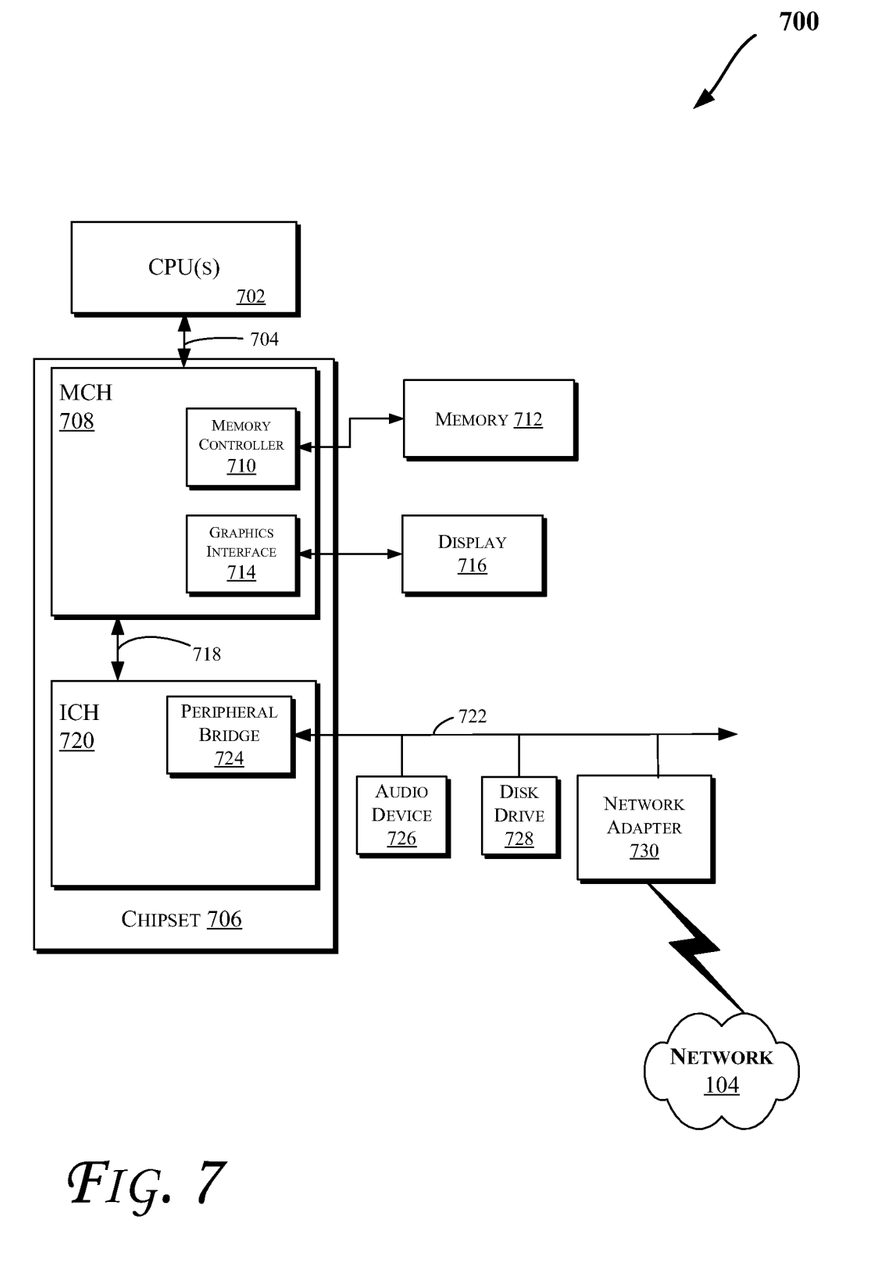

FIG. 7 illustrates a block diagram of an embodiment of a computing system 700. One or more of the components of FIG. 1 and/or FIG. 2 may comprise one or more components discussed with reference to the computing system 700. The computing system 700 may include one or more central processing unit(s) (CPUs) 702 (which may be collectively referred to herein as "processors 702" or more generically "processor 702") coupled to an interconnection network (or bus) 704. The processors 702 may be any type of processor such as a general purpose processor, a network processor (which may process data communicated over a computer network 104), etc. (including a reduced instruction set computer (RISC) processor or a complex instruction set computer (CISC)). Moreover, the processors 702 may have a single or multiple core design. The processors 702 with a multiple core design may integrate different types of processor cores on the same integrated circuit (IC) die. Also, the processors 702 with a multiple core design may be implemented as symmetrical or asymmetrical multiprocessors.

The processor 702 may include one or more caches (not shown), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L-3), a mid-level cache, a last level cache (LLC), etc. to store electronic data (e.g., including instructions) that is utilized by one or more components of the system 700.

A chipset 706 may additionally be coupled to the interconnection network 704. Further, the chipset 706 may include a memory control hub (MCH) 708. The MCH 708 may include a memory controller 710 that is coupled to a memory 712. In an embodiment, the MCH may also include graphics logic and as a result may be referred to as a graphics MCH (GMCH). The memory 712 may store data, e.g., including sequences of instructions that are executed by the processor 702, or any other device in communication with components of the computing system 700. In an embodiment, the memory 712 may be the same or similar to the memory subsystems shown in FIG. 2. Also, in one embodiment of the invention, the memory 712 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 704, such as multiple processors and/or multiple system memories.

The MCH 708 may further include a graphics interface 714 coupled to a display device 716 (e.g., via a graphics accelerator in an embodiment). In one embodiment, the graphics interface 714 may be coupled to the display device 716 via an accelerated graphics port (AGP). In an embodiment of the invention, the display device 716 (such as a flat panel display) may be coupled to the graphics interface 714 through, for example, a signal converter that translates a digital representation of an image stored in a storage device such as video memory or system memory (e.g., memory 712) into display signals that are interpreted and displayed by the display 716.

As shown in FIG. 7, a hub interface 718 may couple the MCH 708 to an input/output control hub (ICH) 720. The ICH 720 may provide an interface to input/output (I/O) devices coupled to the computing system 700. The ICH 720 may be coupled to a bus 722 through a peripheral bridge (or controller) 724, such as a peripheral component interconnect (PCI) bridge that may be compliant with the PCIe specification, a universal serial bus (USB) controller, etc. The bridge 724 may provide a data path between the processor 702 and peripheral devices. Other types of topologies may be utilized. Also, multiple buses may be coupled to the ICH 720, e.g., through multiple bridges or controllers. For example, the bus 722 may comply with the PCI Local Bus Specification, Revision 7.0, Mar. 9, 7004, available from the PCI Special Interest Group, Portland, Oreg., U.S.A. (hereinafter referred to as a "PCI bus"). Alternatively, the bus 722 may comprise a bus that complies with the PCI-X Specification Rev. 7.0a, Apr. 73, 7003, (hereinafter referred to as a "PCI-X bus") and/or PCIe specification, available from the aforesaid PCI Special Interest Group, Portland, Oreg., U.S.A. Further, the bus 722 may comprise other types and configurations of bus systems. Moreover, other peripherals coupled to the ICH 720 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 722 may be coupled to an audio device 726, one or more disk drive(s) 728, and a network adapter 730 (which may be a NIC in an embodiment). In one embodiment, the network adapter 730 or other devices coupled to the bus 722 may communicate with the chipset 706. Other devices may be coupled to the bus 722. Also, various components (such as the network adapter 730) may be coupled to the MCH 708 in some embodiments of the invention. In addition, the processor 702 and the MCH 708 may be combined to form a single chip.

Additionally, the computing system 700 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 728), a floppy disk, a compact disk ROM (CD-ROM), a digital versatile disk (DVD), flash memory, a magneto-optical disk, or other types of nonvolatile machine-readable media capable of storing electronic data (e.g., including instructions).

Figure 8:
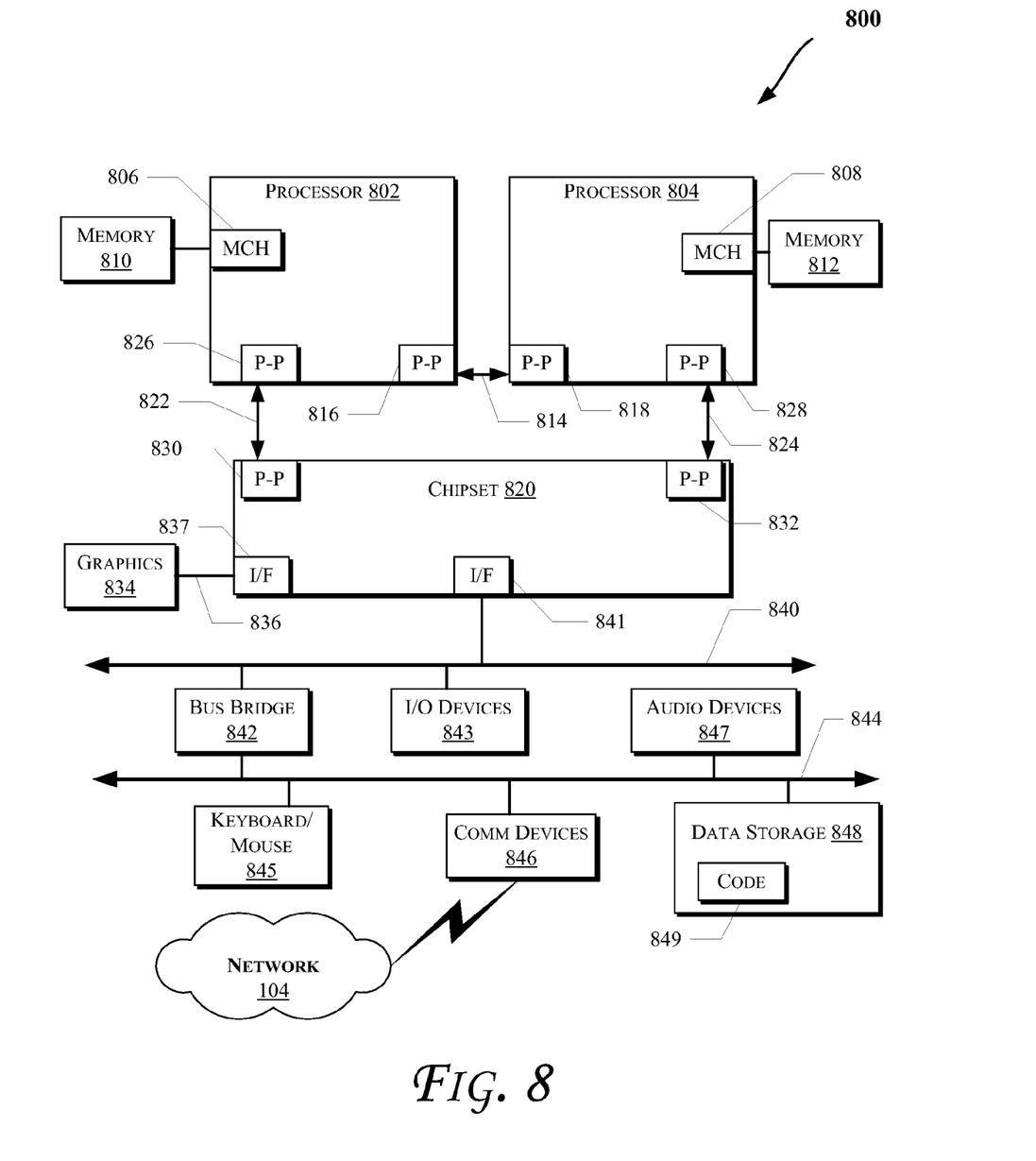

FIG. 8 illustrates a computing system 800 that is arranged in a point-to-point (PtP) configuration, according to an embodiment of the invention. In particular, FIG. 8 shows a system where processors, memory, and input/output devices are interconnected by a number of point-to-point interfaces. The operations discussed with reference to FIGS. 1-7 may be performed by one or more components of the system 800.

As illustrated in FIG. 8, the system 800 may include several processors, of which only two, processors 802 and 804 are shown for clarity. The processors 802 and 804 may each include a local memory controller hub (MCH) 806 and 808 to enable communication with memories 810 and 812. The memories 810 and/or 812 may store various data such as those discussed with reference to the memory 712 of FIG. 7. As shown in FIG. 8, the processors 802 and 804 may also include one or more cache(s) discussed with reference to FIG. 7.

In an embodiment, the processors 802 and 804 may be one of the processors 702 discussed with reference to FIG. 7. The processors 802 and 804 may exchange data via a point-to-point (PtP) interface 814 using PtP interface circuits 816 and 818, respectively. Also, the processors 802 and 804 may each exchange data with a chipset 820 via individual PtP interfaces 822 and 824 using point-to-point interface circuits 826, 828, 830, and 832. The chipset 820 may further exchange data with a high-performance graphics circuit 834 via a high-performance graphics interface 836, e.g., using a PtP interface circuit 837.

In at least one embodiment, one or more operations discussed with reference to FIGS. 1-7 may be performed by the processors 802 or 804 and/or other components of the system 800 such as those communicating via a bus 840. Other embodiments of the invention, however, may exist in other circuits, logic units, or devices within the system 800 of FIG. 8. Furthermore, other embodiments of the invention may be distributed throughout several circuits, logic units, or devices illustrated in FIG. 8.

Chipset 820 may communicate with the bus 840 using a PtP interface circuit 841. The bus 840 may have one or more devices that communicate with it, such as a bus bridge 842 and I/O devices 843. Via a bus 844, the bus bridge 842 may communicate with other devices such as a keyboard/mouse 845, communication devices 846 (such as modems, network interface devices, or other communication devices that may communicate with the computer network 104), audio I/O device, and/or a data storage device 848. The data storage device 848 may store code 849 that may be executed by the processors 802 and/or 804.

In various embodiments of the invention, the operations discussed herein, e.g., with reference to FIGS. 1-8, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
a storage unit to store a first table corresponding to routing paths between a plurality of components, coupled via one or more communication links, prior to a hot-plug event and a second table corresponding to routing paths between the plurality of components after the hot-plug event, wherein entries in the first table are to indicate routing information from each source of the plurality of components to each destination of the plurality of components prior to the hot-plug event, wherein entries in the second table are to indicate routing information from each source of the plurality of components to each destination of the plurality of components after the hot-plug event, wherein the hot-plug event is to correspond to an interrupt servicing event; and
logic to compare entries in the first table and the second table to determine which corresponding routing table array (RTA) registers are to be modified in response to the hot-plug event, wherein each of the plurality of RTA registers is to store routing data associated with a respective one of the plurality of components to indicate packet routing information to the plurality of the components, wherein the logic is to cause performance of a removal operation after occurrence of the interrupt servicing event, wherein the removal operation is to comprise: pausing of traffic flow through the one or more communication links, perform one or more additional operations, and unpausing the traffic flow through the one or more communication links.

2. The apparatus of claim 1, wherein the logic is to cause modification of data stored in the determined RTA registers in accordance with entries of the second table.

3. The apparatus of claim 2, wherein entries of the second table that are read to modify the determined RTA registers store data that is different from data stored in corresponding entries of the first table.

4. The apparatus of claim 1, further comprising a processor that comprises the logic.

5. The apparatus of claim 4, wherein the processor comprises one or more processor cores.

6. The apparatus of claim 1, wherein one or more of the plurality of components, the storage unit, or the logic are on a same integrated circuit die.

7. The apparatus of claim 1, wherein the plurality of components comprise one or more of: one or more processors, one or more interface devices, or one or more memory devices.

8. The apparatus of claim 1, wherein the one or more communication links comprise one or more point-to-point links.

9. The apparatus of claim 1, wherein the hot-plug event corresponds to one or more of: adding a component, removing a component, or modifying a component of a linked based computing system.

10. The apparatus of claim 1, wherein the storage unit comprises a first storage device to store the first table and a second storage device to store the second table.

11. The apparatus of claim 1, wherein the logic is to compare the entries in the first table and the second table, without a need for comparing entries in routing tables of each of the plurality of components, to determine which corresponding RTA registers are to be modified in response to the hot-plug event.

12. The apparatus of claim 1, wherein the interrupt servicing event is to comprise a management interrupt event.

13. A method comprising:
determining routing paths between a plurality of components in a link based computing system in response to occurrence of a hot-plug event;
storing data corresponding to routing paths between the plurality of components after occurrence of the hot-plug event in a first table, wherein the hot-plug event corresponds to an interrupt servicing event;

comparing the first table to a second table that stores data corresponding to routing paths between the plurality of components prior to occurrence of the hot-plug event, wherein entries in the first table indicate routing information from each source of the plurality of components to each destination of the plurality of components prior to the hot-plug event, and entries in the second table indicate routing information from each source of the plurality of components to each destination of the plurality of components after the hot-plug event; and updating one or more routing table array (RTA) registers based on results of the comparing, wherein each of the one or more RTA registers stores routing data associated with a respective one of the plurality of components to indicate packet routing information to the plurality of the components, wherein performance of a removal operation after occurrence of the interrupt servicing event comprises: pausing of traffic flow through one or more communication links, coupled between the plurality of components, performing one or more additional operations, and unpausing the traffic flow through the one or more communication links.

14. The method of claim 13, further comprising detecting an occurrence of the hot-plug event.

15. The method of claim 13, wherein updating the one or more RTA registers is based on entries of the first table.

16. The method of claim 13, further comprising replacing data stored in the second table with data stored in the first table.

17. The method of claim 13, wherein the hot-plug event corresponds to one or more of: adding a component, removing a component, or modifying a component of a linked based computing system.

18. A system comprising:
one or more point-to-point links to couple a plurality of components;
a plurality of routing table array (RTA) registers, wherein each of the plurality of RTA registers is to store routing data associated with a respective one of the plurality of components to indicate packet routing information to the plurality of the components;
a storage unit to store a first table corresponding to routing paths between the plurality of components prior to a hot-plug event and a second table corresponding to routing paths between the plurality of components after the hot-plug event, wherein the hot-plug event is to correspond to an interrupt servicing event, wherein entries in the first table are to indicate routing information from each source of the plurality of components to each destination of the plurality of components prior to the hot-plug event, and entries in the second table are to indicate routing information from each source of the plurality of components to each destination of the plurality of components after the hot-plug event; and
a processor to compute data to be stored in the second table in response to occurrence of the hot-plug event and compare entries in the first table and the second table to determine which corresponding RTA registers are to be modified in response to the hot-plug event, wherein the processor is to cause performance of a removal operation after occurrence of the interrupt servicing event, wherein the removal operation is to comprise: pausing of traffic flow through the one or more point-to-point links, perform one or more additional operations, and unpausing the traffic flow through the one or more point-to-point links.

19. The system of claim 18, wherein the processor is to cause modification of data stored in the determined RTA registers in accordance with entries of the second table.

20. The system of claim 18, wherein the processor comprises one or more processor cores.

21. The system of claim 18, wherein one or more of the plurality of components, the storage unit, or the processor are on a same integrated circuit die.

22. The system of claim 18, wherein the plurality of components comprise one or more of: one or more processors, one or more interface devices, or one or more memory devices.

* * * * *